United States Patent [19]

Potter et al.

[11] Patent Number: 5,071,937

[45] Date of Patent: Dec. 10, 1991

[54] COATING COMPOSITIONS BASED ON BLOCKED POLYISOCYANATES AND STERICALLY HINDERED AROMATIC POLYAMINES

[75] Inventors: Terry A. Potter, New Martinsville; Stephen D. Seneker, Paden City, both of W. Va.

[73] Assignee: Mobay Corporation, Pittsburgh, Pa.

[21] Appl. No.: 575,462

[22] Filed: Aug. 30, 1990

Related U.S. Application Data

[63] Continuation-in-part of Ser. No. 137,122, Dec. 22, 1987, abandoned.

[51] Int. Cl.[5] .................... C08G 18/32; C08G 18/80
[52] U.S. Cl. .................................................. 528/045
[58] Field of Search ............................... 528/45

[56] References Cited

U.S. PATENT DOCUMENTS

| | | | |
|---|---|---|---|
| 4,480,008 | 10/1984 | Farronato et al. | 528/45 |
| 4,500,696 | 2/1985 | Gas | 528/45 |
| 4,935,485 | 6/1990 | Pedain et al. | 528/45 |
| 4,980,399 | 12/1990 | Geist et al. | 528/45 |

Primary Examiner—John Kight, III
Assistant Examiner—Rabon Sergent
Attorney, Agent, or Firm—Joseph C. Gil; Thomas W. Roy

[57] ABSTRACT

The present invention is directed to a coating composition which possesses improved storage stability and contains a) a blocked polyisocyanate prepared by blocking the isocyanate groups of an organic polyisocyanate with a blocking agent based on a di-$C_1$-$C_{12}$-alkyl and/or -alkoxyalkyl malonate or an acetoacetic acid $C_1$-$C_{12}$-alkyl and/or -alkoxyalkyl ester b) an aromatic polyamine, and c) is free from compounds having monofunctional reactivity towards isocyanate groups.

8 Claims, No Drawings

COATING COMPOSITIONS BASED ON BLOCKED POLYISOCYANATES AND STERICALLY HINDERED AROMATIC POLYAMINES

CROSS-REFERENCE TO RELATED APPLICATION

This application is a Continuation-in-Part of U.S. application Ser. No. 07/137,122, filed Dec. 22, 1987, now abandoned.

BACKGROUND OF THE INVENTION

1. Field of the Invention

The present invention is directed to coating compositions based on blocked polyisocyanates and aromatic polyamines which have good storage stability.

2. Description of the Prior Art

Coating compositions based on a blocked polyisocyanate component and a component containing isocyanate-reactive hydrogens are known. The purpose of the blocking agent is to prevent the polyisocyanate from reacting with the isocyanate-reactive component at ambient temperature conditions and thus allow the two components to be mixed and stored prior to their actual use. When the composition is baked at an elevated temperature, the blocking agent is released and the reaction of the two components commences.

It is desirable to use blocking agents for the polyisocyanate which can be released at low curing temperatures in order to reduce energy costs. U.S. Pat. Nos. 2,801,990; 3,779,794; 4,007,215; 4,087,392; 4,101,530; 4,132,843; and 4,332,965; British Pat. Nos. 1,442,024 and 1,523,103; German Offenlegungsschrift No. 2,623,081 and German Auslegeschrift No. 2,639,491 described polyisocyanates blocked with C-H acidic compounds which can be reacted at lower temperatures than polyisocyanates blocked with other known blocking agents. The disadvantage of compositions based on polyisocyanates blocked with C-H acidic compounds and either aliphatic amine or hydroxyl co-reactants is that they must contain stabilizers in order to provide sufficient room temperature stability. Note U.S. Pat. Nos. 4,439,593 and 4,518,522. To the contrary, polyisocyanates blocked with oximes such as methylethylketoxime have better storage stability with hydroxyl co-reactants, but require higher curing temperatures.

Accordingly, it is an object of the present invention to provide coating compositions which cure at low temperatures and have improved storage stability, especially when compared to blocking agents which require higher curing temperatures. It was surprisingly found that these objects could be achieved in accordance with the present invention as described hereinafter.

SUMMARY OF THE INVENTION

The present invention is directed to a coating composition which possesses improved storage stability and contains a) a blocked polyisocyanate prepared by blocking the isocyanate groups of an organic polyisocyanate with a blocking agent based on a di-$C_1$-$C_{12}$-alkyl and/or -alkoxyalkyl malonate or an acetoacetic acid $C_1$-$C_{12}$-alkyl and/or -alkoxyalkyl ester, b) an aromatic polyamine, and c) is free from compounds having monofunctional reactivity towards isocyanate groups.

DETAILED DESCRIPTION OF THE INVENTION

Blocked polyisocyanates which are suitable for use in the compositions have an isocyanate content of about 1 to 30, preferably about 2 to 25 weight percent, based on the unblocked polyisocyanate, contain an average of about 2 to 6, preferably about 2 to 4, blocked isocyanate groups per molecule and may be prepared from any organic polyisocyanate, preferably from polyisocyanates containing 2 to 4 isocyanate groups. Preferred are polyisocyanates having aromatically-, aliphatically- or cycloaliphatically- bound isocyanate groups, or mixtures thereof.

The polyisocyanates used for preparing the blocked isocyanates are adducts prepared from organic polyisocyanates, preferably diisocyanates, and containing biuret, allophanate, urea, urethane, carbodiimide or uretdione groups or isocyanurate rings. Suitable polyisocyanates which may be used for preparing the polyisocyanate adducts include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-2-isocyanatomethyl cyclopentane, 1-isocyanato-3,3,5-trimethyl-5-iso-cyanatomethyl cyclohexane (isophorone diisocyanate or IPDI), 2,4- and 2,6-hexahydrotoluylene diisocyanate and mixtures of these isomers, 2,4'- and/or 4,4'-dicyclohexymethane diisocyanate, α,α,α',α'-tetramethyl-1,3- and/or -1,4-xylylene diisocyanate, 1,3- and 1,4-xylylene diisocyanate, 1-isocyanato-1-methyl-4(3)-isocyanato- methyl-cyclohexane, 1,3- and 1,4-phenylene diisocyanate, 2,4- and 2,6-toluylene diisocyanate and mixtures of these isomers, diphenyl methane-2,4'- and/or -4,4'-diisocyanate, naphthalene-1,5-diisocyanate, triphenyl methane-4,4',4"-triisocyanate, polyphenyl polymethlene polyisocyanates of the type obtained by condensing aniline with formaldehyde followed by phosgenation, and mixtures of the above-mentioned polyisocyanates.

Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714 or 4,220,749 by using co-reactants such as water, tertiary alcohols, primary and secondary monoamines, and primary and/or secondary diamines. The preferred diisocyanate to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Pat. No. 994,890 and German Offenlegungsschrift No. 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift No. 1,150,080; German Offenlegungsschrift No. 2,325,826; and British Pat. No. 1,465,812. The preferred diisocyanates to be used are 2,4-diisocyanatotoluene, 2,6-diisocyanatotoluene, mixtures of the isomers, 1,6-diisocyanatohexane, isophorone diisocyanate and mixtures of the latter two diisocyanates.

Polyisocyanate adducts containing urea or preferably urethane groups and based on the reaction product of the previously mentioned diisocyanates and compounds having a molecular weight of less than 400 and containing 2 or more isocyanate-reactive hydrogens may be prepared according to the process disclosed in U.S. Pat. No. 3,183,112. When preparing polyisocyanate adducts using a large excess of diisocyanate, the average isocyanate functionality may be determined from the functionality of the compounds containing isocyanate- reactive hydrogens. For example, theoretically when an excess of a diisocyanate is reacted with a diol, a polyisocyanate with a functionality of approximately 2 will be produced, while a triol co-reactant will result in a polyisocyanate functionality of at least 3. By using mixtures of compounds containing isocyanate- reactive hydrogens, various functionalities can be obtained. The preferred isocyanate-reactive hydrogens are provided by hydroxyl groups, although other groups such as amino groups are not excluded. Suitable compounds containing isocyanate-reactive hydrogens are disclosed in U.S. Pat. No. 3,183,112, incorporated herein by reference, and include ethylene glycol, 1,2- and 1,3-propylene glycol, 1,3- and 1,4-butanediol, 1,6-hexanediol, 1,8-ocatanediol, neopentyl glycol, diethylene glycol, 2-methyl-1,3-propylene glycol, 2,2-dimethyl-1,3-propylene glycol, the various isomeric bis-hydroxymethyl cyclohexanes, 2,2,4-trimethyl-1,3-pentanediol, glycerine, trimethylol propane, ethylene diamine, diethylene triamine, triethylene tetraamine, 1,6-hexanediamine, piperazine, 2,5-dimethyl piperazine, 1-amino-3-aminomethyl-3,5,5-trimethylcyclohexane, bis(4-aminocyclohexyl)methane, bis(4-amino-3-methylcyclohexyl)methane, 1,4-cyclohexanediamine, 1,2-propanediamine, hydrazine, aminoacid hydrazides, hydrazides of semicarbazido carboxylic acids, bis-hydrazides and bis-semicarbazides. 1,3- and 1,4-butanediol, 2,2,4-trimethyl-1,3-pentanediol, trimethylol propane and mixtures thereof are particularly preferred. It is also possible to use any of the previously described polyisocyanate adducts for the further preparation of polyisocyanate adducts containing urethane or urea groups. Preferred diisocyanates are 2,4-toluylene diisocyanate and/or 2,6-toluylene diisocyanate, 1,6-hexamethylene diisocyanate, isophorone diisocyanate and mixtures of these diisocyanates.

In addition to using the previously described polyisocyanate adducts for preparing the blocked polyisocyanate component of the present invention, it is also suitable to prepare the blocked polyisocyanate component from isocyanate-terminated prepolymers. These prepolymers are formed by reacting an excess of the previously described polyisocyanates with high molecular weight isocyanate-reactive compounds and optionally low molecular weight isocyanate-reactive compounds. Prepolymers prepared exclusively from polyisocyanates and low molecular weight isocyanate-reactive compounds are referred to as polyisocyanate adducts containing urea and/or urethane groups and have previously been discussed. A sufficient excess of the polyisocyanate should be used to ensure that the prepolymers are terminated with isocyanate groups.

It should also be ensured that the isocyanate-terminated prepolymers remain soluble in the commonly used polyurethane solvents and do not gel. Gelation may result when sufficiently cross-linked, isocyanate-terminated prepolymers are prepared from polyisocyanates or isocyanate-reactive compounds containing more than two reactive groups. Minimal amounts of cross-linking do not lead to gelation; however, once a sufficient cross-linked density is achieved, gelation occurs. The critical cross-link density, commonly referred to as the gel point, may be calculated by known methods or readily determined by simply reacting the desired components and observing whether gel particles form. In order to avoid gelation, it is preferred to prepare the isocyanate-terminated prepolymers from the polyisocyanates described as suitable for use in preparing the polyisocyanate adducts rather than using the polyisocyanate adducts themselves. It is additionally preferred to prepare the isocyanate-terminated prepolymers from high molecular weight isocyanate-reactive compounds which do not contain excessive amounts of branching in order to further reduce the possibility that gelation will occur. Finally, it is preferred to prepare the isocyanate-terminated prepolymers by adding the isocyanate-reactive compound to the polyisocyanate since this helps to maintain an excess of isocyanate throughout the formation of the prepolymer.

The high molecular weight compounds to be used with the previously described polyisocyanates for preparing the isocyanate-terminated prepolymers are selected from the known compounds containing isocyanate-reactive groups, preferably hydroxyl groups, which are at least difunctional in the sense of the isocyanate-addition reaction. These compounds generally have an average functionality of about 2 to 8, preferably 2 to 4. The compounds containing at least two isocyanate-reactive hydrogen atoms generally have a molecular weight of 400 to about 10,000, preferably 400 to about 8,000.

Examples of high molecular weight compounds include:

1) polyhydroxyl polyesters which are obtained from polyhydric, preferably dihydric alcohols to which trihydric alcohols may be added, and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be saturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. Suitable polyhydric alcohols include the polyhydric alcohols previously set forth for preparing the polyisocyanate adducts containing urea or urethane groups.

2) Polylactones generally known from polyurethane chemistry, e.g., polymers of caprolactone initiated with the above-mentioned polyhydric alcohols.

3) Polycarbonates containing hydroxyl groups such as the products obtained from reaction of the polyhydric alcohols previously set forth for preparing the polyisocyanate adducts containing urea or urethane groups, preferably dihydric alcohols such as 1,3-propanediol, 1,4-butanediol, 1,4-dimethylol cyclohexane, 1,6-hexanediol, diethylene glycol, triethylene glycol or tetraethylene glycol with phosgene, diaryl carbonates such as diphenyl carbonate or cyclic carbonates such as ethylene or propylene carbonate. Also suitable are polyester carbonates obtained from the reaction of lower molecular weight oligomers of the above-mentioned polyesters or polylactones with phosgene, diaryl carbonates or cyclic carbonates.

4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Suitable starting compounds containing at least one reactive hydrogen atom include the polyols set forth as suitable for preparing the polyisocyanate adducts containing urethane or urea groups and, in addition, water, methanol, ethanol, 1,2,6-hexanetriol, 1,2,4-butanetriol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include those set forth as suitable for preparing the polyisocyanate adducts containing urethane or urea groups and also ammonia, methylamine, tetramethylenediamine, ethanolamine, diethanolamine, triethanolamine, aniline, phenylenediamine, 2,4- and 2,6-toluylenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups, while compounds containing tertiary amine groups are less preferred and compounds containing isocyanate-reactive-NH groups are much less preferred. Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351; 3,304,273; 3,523,095; and 3,110,695; and German Pat. No. 1,152,536). Also suitable as polyethers are amino polyethers wherein at least a portion of the hydroxyl groups of the previously described polyethers are converted to amino groups.

5) Polythioethers such as the condensation products obtained from thiodiglycol on its own and/or with other glycols, dicarboxylic acids, formaldehyde, amino carboxylic acids or amino alcohols. The products are either polythio mixed ethers, polythio ether esters, or polythioether ester amides, depending on the co-components.

6) Polyacetals including those obtained from the above-mentioned polyhydric alcohols, especially diethylene glycol, triethylene glycol, 4,4'-dioxyethoxy-diphenyldimethylene, 1,6-hexanediol and formaldehyde. Polyacetals suitable for use in the invention may also be prepared by the polymerization of cyclic acetals.

7) Polyether esters containing isocyanate-reactive groups which are known in the art.

8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

9) Polyacrylates including those based on acrylic acid, methacrylic acid and crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidylacrylate, glycidyl methacrylate, 2-isocyanatoethyl acrylate and 2-isocyanatoethyl methacrylate.

The preferred high molecular weight isocyanate-reactive compounds for use in the process according to the invention are the polyhydroxyl polyethers, polyesters, polylactones, polycarbonates and polyester carbonates.

In addition to the high molecular weight compounds, the isocyanate-terminated prepolymers may also optionally be prepared from low molecular weight isocyanate-reactive compounds having an average molecular weight of up to 400. The low molecular weight isocyanate-reactive compounds should have an average functionality of about 2 to 8, preferably from about 2 to 6 and most preferably from about 2 to 4, and may also contain ether, thioether, ester, urethane and/or urea bonds.

Examples of low molecular weight compounds include the polyamines and diols or triols used as chain lengthening agents or cross-linking agents in polyurethane chemistry such as those listed as suitable for preparing the polyisocyanate adducts containing urethane or urea groups and the polyester and polyether polyols. Additional examples include those set forth in U.S. Pat. Nos. 4,439,593 and 4,518,522, both of which are herein incorporated by reference in their entirety.

Prior to their use in accordance with the present invention, the polyisocyanate adducts are blocked with C-H acidic compounds such as a di-$C_1$-$C_{12}$-alkyl and/or -alkoxyalkyl, preferably a $C_1$-$C_4$-dialkyl malonate or an acetoacetic acid $C_1$-$C_{12}$-, preferably a $C_1$-$C_4$-alkyl or -alkoxyalkyl ester. Preferred blocking agents are ethylacetoacetate, ethoxyethylacetoacetate and most preferably diethyl malonate. Preferably, these blocking agents are used as the sole blocking component for reaction with the polyisocyanates. However, it is possible to use up to about 20 mole %, preferably up to about 10 mole %, of other known blocking agents, e.g. secondary or tertiary alcohols such as isopropanol or t-butanol; oximes such as formaldoxime, acetaldoxime, butanone oxime, cyclohexanone oxime, acetophenone oxime, benzophenone oxime or diethyl glyoxime; lactams such as ε-caprolactam or δ-valerolactam; phenols such as phenol or cresol; N-alkyl amides such as N-methyl acetamide; imides such as phthalimide; imidazole; or alkali metal bisulfites. While polyisocyanates blocked with these other known blocking agents will react normally with isocyanate-reactive compounds when using sufficiently elevated temperatures, they will not react significantly at the preferred low temperature baking conditions which may be employed for curing compositions containing polyisocyanates blocked with the C-H acidic compounds. Accordingly, polyisocyanates blocked with these other known blocking agents should only be used in the amounts specified when low temperature baking conditions are employed. To compensate for the low reactivity of these blocked polyisocyanates the amount of the isocyanate-reactive component to be used in combination with the compositions of the present invention may be correspondingly reduced. The unreacted blocked polyisocyanates will remain in the cured coating and provide a softening effect.

The reaction between the polyisocyanates and the blocking agent is generally conducted at above about 50° C., preferably from about 60° to 100° C., optionally in the presence of a basic catalyst such as diazabicyclooctane, triethyl amine, alkali metal alcoholates such as sodium methoxide or alkali metal phenolates such as sodium phenolate.

Suitable co-reactants for use in combination with the blocked polyisocyanate adducts are aromatic polyamines and include 2,4- and/or 2,6-diaminotoluylene, 2,4'- and/or 4,4'-diaminodiphenyl methane, 1,2- and 1,4-phenylene diamine, naphthalene-1,5-diamine and triphenylmethane-4,4',4''-triamine. Liquid mixtures of polyphenyl polymethylene-polyamines, of the type obtained by condensing aniline/formaldehyde, are also suitable.

Preferred co-reactants are the sterically hindered aromatic diamines which contain at least one linear or branched alkyl substituents in the ortho-position to the first amino group and at least one, preferably two linear branched or alkyl substituents containing from 1 to 4, preferably 1 to 3 carbon atoms in the ortho-position to a second amino group. These aromatic diamines include 1-methyl-3,5-diethyl-2,4-diaminobenzene, 1-methyl-3,5-diethyl-2,6-diaminobenzene, 1,3,5-trimethyl-2,4-diaminobenzene, 1,3,5-triethyl-2,4-diaminobenzene, 3,5,3',5'-tetraethyl-4,4'-diaminodiphenylmethane, 3,5,3'5'-tetraisopropyl-4,4'-diaminodiphenylmethane, 3,5-diethyl-3',5'-diisopropyl-4,4'-diaminodiphenylmethane, 3,3'-diethyl-5,5'-diisopropyl-4,4'-diaminodiphenylmethane, 1-methyl-2,6-diamino-3-isopropylbenzene and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15, preferably about 65:35 to 80:20.

It is also possible in accordance with the present invention to use high molecular weight compounds which contain terminal aromatic amino groups as co-reactants for the blocked polyisocyanate adducts in accordance with the present invention. Examples of these high molecular weight compounds include polyethers wherein the terminal hydroxyl groups have been converted to aromatic amino groups. Suitable methods for preparing such high molecular weight compounds are set forth in U.S. Pat. No. 4,515,923, herein incorporated by reference in its entirety.

While minor amounts of other isocyanate-reactive compounds may be used in combination with the aromatic diamines, the diamines should be present in an amount such that at least about 80%, preferably at least about 90% and most preferably 100% of the reactive groups for the blocked polyisocyanate adducts are aromatic amino groups. The aromatic polyamine component is used in an amount sufficient to provide about 0.8 to 1.2 aromatic amino groups, preferably about 0.9 to 1.1 and most preferably about 1.0 aromatic amino groups for each blocked isocyanate group.

A solvent or solvent mixture may be used during the production of the blocked polyisocyanates. When a solvent is employed, the solvent or solvent mixture preferably remains in the composition until it is used. However, it is of course also possible to use a solvent simply to promote thorough mixing of the compounds used for preparing the blocked polyisocyanates and subsequently to distill off this solvent (in vacuo) leaving a ready-to-use mixture in solvent-free form which may be redissolved in solvents at any later stage.

Suitable solvents include the known polyurethane solvents, for example, toluene, xylene, butyl acetate, ethylacetate, ethylene glycol monoethyl ether acetate (EGA), ethylene glycol monomethyl ether acetate, ethylene glycol monobutyl ether acetate, diethylene glycol monoethyl ether acetate, diethylene glycol monomethyl ether acetate, diethylene glycol monobutyl ether acetate, propylene glycol monomethyl ether acetate, methyl ethyl ketone or methyl isobutyl ketone, hydrocarbon solvents such as hexane and heptane, aromatic solvents and also mixtures of the above solvents.

In the compositions prepared according to the present invention, the use of solvents is not always necessary, the solvent being used primarily to reduce the viscosity of the compositions to a workable range. Generally the solids content of the composition is greater than 20% and may be as high as 100%, based on the weight of the blocked polyisocyanate.

Additives, such as catalysts, pigments, dyes and levelling aids, may be added as required to the compositions of the present invention.

The compositions produced according to the present invention may be stored as such for prolonged periods at room temperature without gel formation or any other undesirable changes occurring. The compositions according to the present invention do not require the presence of the stabilizers having monofunctional reactivity towards isocyanate groups which are disclosed in U.S. Pat. Nos. 4,439,593 and 4,518,522 in order to possess storage stability. These compositions may be diluted as required to a suitable concentration and applied by conventional methods, for example spraying or spread coating, and heated, generally to temperatures in excess of about 100° C., preferably from about 100° to 150° C., more preferably from about 120° to 130° C., in order to cure the coating.

The coating compositions may be used as coating agents for primer, intermediate or surface coatings for a variety of different substrates. The resulting coatings possess excellent adhesion to substrates, are uniform and exhibit excellent mechanical and chemical properties and water and solvent resistance, especially hardness, impact resistance and elasticity.

The invention is further illustrated but is not intended to be limited by the following examples in which all parts and percentages are by weight unless otherwise specified.

EXAMPLES

PREPARATION OF THE ISOCYANATE PREPOLYMERS

Polyisocyanate Component I 800 parts of a polyether (MW 550) based on polypropylene oxide/bisphenol A were reacted with 1000 parts of 4,4'-diphenylmethane diisocyanate at a temperature of 70° C. until an isocyanate content of 11.8% was obtained.

Polyisocyanate Component II 73 parts of diethylene glycol, 181 parts of trimethylol propane and 678 parts of polypropylene glycol (MW 1000) were mixed with 837 parts of propylene glycol monomethyl ether acetate (PM Acetate) and 837 parts of xylene. 1000 parts of a diisocyanate mixture of 80% 2,4- and 20% 2,6-diisocyanatotoluene were then added to the mixture and the temperature was increased to 80° C. for 2 hours. The temperature was then raised to 100° C. until an isocyanate content of 5.5% was obtained.

PREPARATION OF THE BLOCKED ISOCYANATES TO BE USED IN THE INVENTION

EXAMPLE 1

814 parts of diethyl malonate and 9.4 parts of 25% sodium methoxide in methanol were added to 1800 parts of Polyisocyanate Component I at a temperature of 40° C. The reaction mixture was heated to 70° C. and maintained at that temperature until the isocyanate content was below 0.5%. Then 1433 parts of light aromatic solvent naphtha and 719 parts of propylene glycol monomethyl ether acetate were added. The remaining isocyanate was reacted with a stoichiometric amount of isopropanol at a temperature of 70° C. until the isocyanate content was essentially zero as determined by infrared spectroscopy.

EXAMPLE 2 (COMPARISON)

442 parts of butanone oxime were added dropwise to 1800 parts of Polyisocyanate Component I at a temperature of 30°-40° C. The temperature of the reaction mixture increased (exothermic reaction) to 70° C. The mixture was maintained at 70° C. until the isocyanate content was essentially zero as determined by infrared spectroscopy. Then 1260 parts of light aromatic solvent naphtha and 620 parts of propylene glycol monomethyl ether acetate (PM Acetate) were added.

EXAMPLE 3

177 parts of ethyl acetoacetate and 2.4 parts of 25% sodium methylate in methanol were added to 1000 parts of Polyisocyanate Component II at a temperature of 50° C. The mixture was maintained at 70° C. until the NCO content was essentially zero, as determined by infrared spectroscopy.

EXAMPLE 4

220 parts of diethyl malonate and 2.4 parts of 25% sodium methylate in methanol were added to 1000 parts of Polyisocyanate Component II at a temperature of 40° C. This mixture was maintained at 70° C. until the isocyanate content was below 0.5%. The remaining NCO was reacted with a stoichiometric amount of isopropanol until the isocyanate content was essentially zero, as determined by infrared spectroscopy.

EXAMPLE 5 (COMPARISON)

116 parts of butanone oxime were added to 1000 parts of Polyisocyanate Component II at a temperature of 30° C. The temperature of the reaction mixture increased (exothermic reaction) to 70° C. The mixture was maintained at 70° C. until the isocyanate content was essentially zero, as determined by infrared spectroscopy.

AMBIENT TEMPERATURE VISCOSITY STABILITY OF BLOCKED ISOCYANATE/AMINE CURATIVE SYSTEM PREPARED ACCORDING TO THE INVENTION

EXAMPLES 6-17

Compositions of blocked isocyanates, aromatic polyamines and optionally solvent were prepared as set forth in Tables I and II. These compositions were formulated at an isocyanate to amine ratio of 1.0:1.0. The ambient temperature viscosity stability of the mixtures was measured at 25° C. at the indicated times. The fractional viscosity increases, as defined by the viscosity at the indicated time divided by the initial viscosity, are listed in parentheses below the viscosity measurements.

FILM CURE TIME VERSUS TEMPERATURE PROFILES OF BLOCKED ISOCYANATE/AMINE CURATIVE SYSTEMS PREPARED ACCORDING TO THE INVENTION

EXAMPLES 18 AND 19

The film cure time versus temperature profiles for a diethyl malonate blocked polyisocyanate (Example 18) and a butanone oxime blocked polyisocyanate (Example 19) in combination with an amine curative are listed in Tables III and IV, respectively. The film cure was determined by the "MEK double-rub test." In this test, a cotton ball saturated with methyl ethyl ketone was rubbed back and forth across a film on a substrate. A double rub was defined as one back and forth motion across the film. The number of double rubs required to penetrate the film to the substrate surface was determined and was proportional to the degree of cure. The values in Tables III and IV are averages of at least three determinations.

TABLE I

| | | | AMBIENT TEMPERATURE STORAGE STABILITY | | | | | | | | | |
|---|---|---|---|---|---|---|---|---|---|---|---|---|
| | | Parts by | VISCOSITY (mpa · s @ 25 degrees C.) (FRACTIONAL INCREASE IN VISCOSITY) | | | | | | | | | |
| Example | Components | Weight | Initial | 2 days | 4 days | 7 days | 10 days | 14 days | 17 days | 21 days | 24 days | 31 days |
| 6 | Example 1 Blocked Isocyanate | 200.00 | 108 | 112 | 119 | 129 | 133 | 146 | 149 | 164 | 174 | 220 |
| | 2,4-diaminotoluene | 12.41 | | (1.0) | (1.1) | (1.2) | (1.2) | (1.3) | (1.4) | (1.5) | (1.6) | (2.0) |
| | PM acetate | 23.05 | | | | | | | | | | |
| 7 (Comp) | Example 2 Blocked Isocyanate | 200.00 | 250 | 263 | 291 | 319 | 354 | 450 | 540 | 754 | 1054 | 3300 |
| | 2,4-diaminotoluene | 14.37 | | (1.1) | (1.2) | (1.3) | (1.4) | (1.8) | (2.2) | (3.0) | (4.2) | (13.2) |
| | PM acetate | 26.69 | | | | | | | | | | |
| 8 | Example 3 Blocked Isocyanate | 200.00 | 204 | 312 | 482 | 540 | 634 | 780 | 798 | 1480 | 7000 | gel |
| | 2,4-diaminotoluene | 13.42 | | (1.5) | (2.4) | (2.7) | (3.1) | (3.8) | (3.9) | (7.3) | (34.3) | |
| | PM acetate | 24.92 | | | | | | | | | | |

TABLE I-continued

AMBIENT TEMPERATURE STORAGE STABILITY

| Example | Components | Parts by Weight | VISCOSITY (mpa · s @ 25 degrees C.) (FRACTIONAL INCREASE IN VISCOSITY) | | | | | | | | | |
|---|---|---|---|---|---|---|---|---|---|---|---|---|
| | | | Initial | 2 days | 4 days | 7 days | 10 days | 14 days | 17 days | 21 days | 24 days | 31 days |
| 9 | Example 4 Blocked Isocyanate | 200.00 | 1238 | 1360 (1.1) | 1750 (1.4) | 1900 (1.5) | 2380 (1.9) | 2990 (2.4) | 3250 (2.6) | 4200 (3.4) | 4550 (3.7) | 8300 (6.7) |
| | 2,4-diaminotoluene | 12.37 | | | | | | | | | | |
| | PM acetate | 23.06 | | | | | | | | | | |
| 10 (Comp) | Example 5 Blocked Isocyanate | 200.00 | 484 | 690 (1.4) | 984 (2.0) | 4300 (8.9) | 15000 (31.0) | 51000 (105) | 120000 (248) | 142000 (293) | 296000 (611) | gel |
| | 2,4-diaminotoluene | 13.47 | | | | | | | | | | |
| | PM acetate | 25.02 | | | | | | | | | | |
| 11 | Example 3 Blocked Isocyanate | 200.00 | 489 | 557 (1.1) | 602 (1.2) | 696 (1.4) | 666 (1.4) | 748 (1.5) | 1124 (2.3) | 1570 (3.2) | 3270 (6.7) | 5950 (12.2) |
| | Diethyltoluenediamine | 19.58 | | | | | | | | | | |
| 12 | Example 4 Blocked Isocyanate | 200.00 | 2170 | 2400 (1.1) | 2900 (1.3) | 3160 (1.5) | 3850 (1.8) | 4910 (2.3) | 5160 (2.4) | 7250 (3.3) | 8060 (3.7) | 15700 (7.2) |
| | Diethyltoluenediamine | 18.09 | | | | | | | | | | |
| 13 (Comp) | Example 5 Blocked Isocyanate | 200.00 | 1584 | 2288 (1.4) | 5260 (3.3) | 7600 (4.8) | 17680 (11.2) | 54000 (34.1) | 114000 (72.0) | 280000 (176) | 400000 (253) | gel |
| | Diethyltoluenediamine | 19.66 | | | | | | | | | | |

TABLE II

AMBIENT TEMPERATURE STORAGE STABILITY

| Example | Components | Parts by Weight | VISCOSITY (mpa · s @ 25 degrees C.) (FRACTIONAL INCREASE IN VISCOSITY) | | | | | |
|---|---|---|---|---|---|---|---|---|
| | | | Initial | 2 days | 4 days | 18 days | 40 days | 47 days |
| 14 | Example 4 Blocked Isocyanate | 200.00 | 750 | 830 (1.1) | 950 (1.3) | 1510 (2.0) | 4100 (5.5) | 4260 (5.7) |
| | Diethyltoluenediamine | 18.09 | | | | | | |
| | PM acetate | 37.38 | | | | | | |
| 15 (Comp) | Example 5 Blocked Isocyanate | 200.00 | 290 | 340 (1.2) | 690 (2.4) | 57000 (195) | gel | |
| | Diethyltoluenediamine | 19.66 | | | | | | |
| | PM acetate | 40.62 | | | | | | |
| 16 | Example 4 Blocked Isocyanate | 200.00 | 780 | 880 (1.1) | 950 (1.2) | 1940 (2.5) | 8240 (10.6) | 9500 (12.2) |
| | 4,4'diphenylmethane Diamine | 20.13 | | | | | | |
| | PM acetate | 37.38 | | | | | | |
| 17 (Comp) | Example 5 Blocked Isocyanate | 200.00 | 320 | 390 (1.2) | 540 (1.7) | 49000 (153) | gel | |
| | 4,4-diphenylmethane Diamine | 21.87 | | | | | | |
| | PM acetate | 40.62 | | | | | | |

TABLE III

EXAMPLE 18
FILM CURE TIME VERSUS TEMPERATURE
(MEK DOUBLE RUBS)

| Example 4 Blocked Isocyanate | 100.00 parts |
|---|---|
| Diethyltoluenediamine | 9.60 parts |

| Time (minutes) | Temperature (°C.) | |
|---|---|---|
| | 120 | 140 |
| 10 | 300 | 500+ |
| 20 | 400 | 500+ |
| 30 | 500+ | 500+ |
| 50 | 500+ | 500+ |
| 80 | 500+ | 500+ |

TABLE IV

Example 19
FILM CURE TIME VERSUS TEMPERATURE
(MEK DOUBLE RUBS)

| Example 5 Blocked Isocyanate | 100.00 parts |
|---|---|
| Diethyltoluenediamine | 10.40 parts |

| Time (minutes) | Temperature (°C.) | |
|---|---|---|
| | 120 | 140 |
| 10 | 300 | 500+ |
| 20 | 425 | 500+ |
| 30 | 500+ | 500+ |
| 50 | 500+ | 500+ |
| 80 | 500+ | 500+ |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which possesses improved storage stability and comprises
   a) a blocked polyisocyanate prepared by blocking the isocyanate groups of an organic polyisocyanate with a blocking agent which comprises a member selected from the group consisting of di-$C_1$-$C_{12}$-alkyl malonates, di-$C_1$-$C_{12}$-alkoxyalkyl malonates, acetoacetic acid $C_1$-$C_{12}$-alkyl esters, acetoacetic acid $C_1$–$C_{12}$-alkoxyalkyl esters and mixtures thereof, and b) a sterically hindered aromatic polyamine which is sterically hindered by alkyl groups in at least one ortho position to each amino group, wherein said coating composition is free from compounds having monofunctional reactivity towards isocyanate groups.

2. The composition of claim 1 wherein said organic polyisocyanate contains aromatically-bound isocyanate groups.

3. The composition of claim 1 wherein said organic polyisocyanate comprises an isocyanate-terminated prepolymer.

4. The composition of claim 2 wherein said organic polyisocyanate comprises an isocyanate-terminated prepolymer.

5. A coating composition which possesses improved storage stability and comprises a) a blocked polyisocyanate prepared by blocking the isocyanate groups of an organic polyisocyanate with a blocking agent comprising a member selected from the group consisting of diethyl malonate, ethylacetoacetate and mixtures thereof, and b) a sterically hindered aromatic polyamine which is sterically hindered by alkyl groups in at least one ortho position to each amino group, wherein said coating composition is free from compounds having monofunctional reactivity towards isocyanate groups.

6. The composition of claim 5 wherein said organic polyisocyanate contains aromatically-bound isocyanate groups.

7. The composition of claim 5 wherein said organic polyisocyanate comprises an isocyanate-terminated prepolymer.

8. The composition of claim 6 wherein an organic polyisocyanate comprises an isocyanate-terminated prepolymer.

* * * * *